United States Patent [19]

Peters et al.

[11] 3,929,460

[45] Dec. 30, 1975

[54] PROCESS FOR THE PREPARATION OF VANADIUM, VANADIUM ALLOYS OR VANADIUM COMPOUNDS

[75] Inventors: Franciscus J. W. M. Peters; Servaas Middelhoek; Albert Rijkeboer, all of Arnhem, Netherlands

[73] Assignee: Billiton Research B. V., Netherlands

[22] Filed: June 11, 1974

[21] Appl. No.: 478,415

[30] Foreign Application Priority Data
June 25, 1973 Netherlands...................... 7308789

[52] U.S. Cl. .......................... 75/24; 75/84; 75/121
[51] Int. Cl.$^2$...................... C22B 7/04; C22B 34/22
[58] Field of Search ................. 75/121, 24, 84, 101

[56] References Cited
UNITED STATES PATENTS

| | | | |
|---|---|---|---|
| 2,630,369 | 3/1953 | Burwell | 75/101 |
| 3,206,276 | 9/1965 | Burwell | 75/121 |
| 3,343,909 | 9/1967 | Kim | 75/121 |
| 3,372,982 | 3/1968 | Hazen | 75/121 |
| 3,753,681 | 8/1973 | Vojkovic | 75/24 |

*Primary Examiner*—Peter D. Rosenberg
*Attorney, Agent, or Firm*—Jones Tullar & Cooper

[57] ABSTRACT

A process for the preparation of vanadium, vanadium alloys, or vanadium compounds from vanadium-containing slags by heating these slags in a reaction furnace under the influence of sodium carbonate and oxygen at a temperature between 600° and 800°C and subsequently leaching the reaction product with water so that the resultant vanadate enters into solution and is then processed to the desired vanadium product in a manner known per se, characterized in that an amount of sodium carbonate is used at which the ratio (quantity by weight of sodium carbonate/quantity by weight of vanadium calculated as vanadium pentoxide) is at least 1.1 and does not exceed 4.

5 Claims, No Drawings

PROCESS FOR THE PREPARATION OF VANADIUM, VANADIUM ALLOYS OR VANADIUM COMPOUNDS

The invention relates to a process for the preparation of vanadium, vanadium alloys or vanadium compounds from vanadium-containing slags by heating these slags in a reaction furnace under the influence of sodium carbonate and oxygen at a temperature between 600° and 800°C and by subsequently leaching the reaction product with water so that the resultant vanadate enters into solution and is then processed to the desired vanadium product in a manner known per se.

The above process is known in the industry processing vanadium containing convertor slag, wherein, depending on the slag used, such an amount by weight of anhydrous sodium carbonate (soda) is used that the ratio $$\frac{\text{quantity by weight of sodium carbonate}}{\text{quantity by weight of vanadium calculated as vanadium pentoxide}}$$

(hereinafter termed "soda-factor") is, for example 0.85 and 1.05. It has been found that the coefficient of extraction of vanadium is generally between 80 and 90%. The reasons for this may be given as the losses which occur as the result of baking and when the reaction product, during cooling, passes slowly through a temperature zone in which reversible reactions may occur (reversible effect).

It has been found that the above soda factors (0.85 applied to slag material from Russia and 1.05 applied to Highveld slags from South Africa) can hardly be changed. Thus, for example, the soda factor of 1.05 is too high and baking occurs. It could not be expected that these factors could be changed.

Another vanadium extraction process has been disclosed in U.S. Pat. No. 3,300,276, in which process vanadium is solubilized by treatment with a melt essentially consisting of an alkali metal carbonate and an alkali metal chloride in the presence of an oxidizing agent and the resulting fused cake extracted with water. For the melt alkali metal carbonate and alkali metal chloride ratios are from 1:0.5 to 0.5:1. However, large amounts of chloride promote corrosion in the furnace, which is a disadvantage. Moreover, baking occurs and the calculated soda factors (based on alkali) lie well above 4.

Surprisingly, it has now been found that the above drawbacks can be eliminated, the baking phenomena being greatly reduced and the reversible effect no longer being of any significance, by using instead of the usual quantity of sodium carbonate a quantity at which the ratio $$\frac{\text{quantity by weight of sodium carbonate}}{\text{quantity by weight of vanadium calculated as vanadium pentoxide}}$$

is at least 1.1 and does not exceed 4.

For practical reasons the soda factor does not exceed a value of 4. The soda factor preferably has a value of 1.2 – 2.5, in particular of 1.5 – 2.2.

Generally, the slags have a vanadium percentage (calculated as vanadium pentoxide) which is between 10 and 30% by weight. The slag material used originates from the steel or iron manufacture in which oxygen is blown through the iron in order to purify it, so that contaminations such as carbon, titanium, manganese, vanadium and chromium are removed. A supernatant layer will appear on the liquid iron, which mainly consists of ferrosilicate containing vanadium-iron-oxygen spinels.

During processing of the slag the trivalent vanadium is oxidized by the oxygen to pentavalent vanadium and, with the sodium carbonate, a sodium vanadate or a mixture of water-soluble sodium vanadates is formed with evolution of carbon dioxide.

When the process according to the invention was used it was found that baking had greatly reduced, the reversible effect had pratically ceased to have an effect, the filtration rate was improved and the soluble vanadium still left in the residue after the water treatment had greatly been reduced. The coefficient of extraction was greatly increased and values of 98.8 and 98.9% were found. When the reaction time was reduced from the usual two hours to less than one hour a slightly lower coefficient of extraction was found, admittedly, but the coefficient of extraction was distinctly higher than when using the amount of soda customary hitherto.

The temperature of the reaction mixture must be at least 600°C since at lower temperatures, such as for example 500° – 600°C, the reaction proceeds too slowly. Temperatures in excess of 800°C generally produce baking. More particularly, the temperature is 700° to 780°C. It is possible to substitute part of the sodium carbonate by certain sodium silicate or other salts, for example up to 30% by weight of the sodium carbonate.

An additional advantage is that the slags can also be mixed with a slag having a high calcium content and a relatively low vanadium content (such as, for example, Chilean slags). When conventional amounts of soda are used losses occur with the admixture of calcium-containing slags, whereas when the amounts of soda according to the invention are used these losses are eliminated and the filtration rates are improved. Calcium-rich but otherwise normal slags can now also be processed with a greatly increased coefficient of extraction.

The resultant vanadate solutions can be processed to vanadium, vanadium alloys or vanadium compounds by means of processes known per se. Thus, the vanadate solution can be converted to vanadium acid, also known in the art as "red cake," with the aid of sulphuric acid, which cake can be subsequently converted into vanadium pentoxide, $V_2O_5$, by heating at high temperature.

It is also possible to process the vanadate solution to ammonium vanadate with ammonia and/or ammonium salts. The resultant products can be processed either pyrometallurgically or hydrometallurgically.

EXAMPLE

A quantity of 50 g of ground vanadium-containing slags was mixed together with anhydrous soda and sintered while passing oxygen over it in a furnace. Subsequently, the reaction mixture was rapidly or slowly cooled and then leached with water so that the resultant sodium vanadate entered into solution. The decomposition yield was determined (the percentage of soluble vanadate based on the total $V_2O_5$-percentage in the slag). The reaction conditions are given in the following Table.

A number of comparative experiments is included at the end of the Table.

$$\text{Soda-factor} = \frac{\text{quantity by weight of sodium carbonate}}{\text{quantity by weight vanadium calculated as vanadium pentoxide}}$$

TABLE

| No. | g | Slag type 1) | % V$_2$O$_5$ | | Soda-factor | Reaction temp. °C | Reaction time h | Cooling of calcine 2) | Leaching F.S. l/m²/min. | Soluble % V$_2$O$_5$ in residue | Decomposition yield % | Particulars |
|---|---|---|---|---|---|---|---|---|---|---|---|---|
| 1 | 50 | R | 18.5 | | 1.1 | 750 | 2 | A | 4.0 | 0.64 | 93.8 | 1) H = Highveld (Sth Africa) |
| 2 | 50 | R | 18.5 | | 1.3 | 750 | 2 | A | 5.6 | 0.29 | 95.2 | R = Russian |
| 3 | 50 | R | 18.5 | | 1.5 | 750 | 2 | A | 3.0 | 0.60 | 97.1 | Chil. = Chilean |
| 4 | 50 | R | 18.5 | | 1.7 | 750 | 2 | A | 32 | 0.19 | 97.1 | |
| 5 | 50 | R | 18.5 | | 1.1 | 750 | 2 | B | 84 | 0.08 | 91.3 | 2) A = rapid |
| 6 | 50 | R | 18.5 | | 1.3 | 750 | 2 | B | 29 | 0.11 | 94.7 | B = slow |
| 7 | 50 | R | 18.5 | | 1.5 | 750 | 2 | B | 13 | 0.17 | 96.0 | F.S. = filtration rate |
| 8 | 50 | R | 18.5 | | 1.7 | 750 | 2 | B | 24 | 0.10 | 97.5 | |
| 9 | 50 | H | 28.1 | | 1.77 | 720 | 2 | A | 22 | 0.31 | 96.5 | |
| 10 | 50 | H | 28.1 | | 2.14 | 720 | 2 | B | 40 | 0.18 | 97.8 | |
| 11 | 50 | R | 18.5 | | 1.3 | 700 | 2 | B | 36 | 0.15 | 91.7 | |
| 12 | 50 | R | 18.5 | | 1.5 | 700 | 2 | B | 12 | 0.16 | 92.9 | |
| 13 | 50 | R | 18.5 | | 1.7 | 700 | 2 | B | 5 | 0.09 | 95.0 | |
| 14 | 50 | R | 18.5 | | 1.8 | 700 | 2 | B | 7 | 0.09 | 95.6 | |
| 15 | 50 | R | 18.5 | | 2.0 | 700 | 2 | B | 33 | 0.13 | 94.8 | |
| 16 | 50 | R | 17.9 | | 1.7 | 750 | 2 | B | <100 | 0.17 | 95.5 | 3) 100% ground slag −325 mesh |
| 17 | 50 | R | 17.9 | | 2.0 | 700 | 2 | B | 25 | 0.11 | 95.6 | |
| 18 | 50 | R | 17.3 | | 2.0 | 700 | 2 | B | 42 | 0.09 | 95.6 | 4) +100 mesh fraction |
| 19 | 50 | R | 15.0 | 6) | 2.0 | 750 | 2 | B | 250 | 0.10 | 92.7 | 5) −325 mesh fraction |
| 20 | 50 | R | 18.2 | 4) | 2.03 | 700 | 2 | B | 29 | 0.19 | 89.9 | 6) slag with 3.31% CaO and 2.21% MgO |
| 21 | 50 | R | 19.4 | 5) | 1.91 | 700 | 2 | B | 29 | 0.15 | 96.9 | |
| 22 | 50 | R | 15.81 | 3) | 2.0 | 750 | 2 | B | 23 | 0.36 | 93.3 | |
| 23 | 50 | R | 18.5 | | 2.0 | 720 | 0.75 | A | 35 | 0.13 | 93.8 | |
| 24 | 50 | R | 18.5 | | 2.0 | 720 | 2 | A | 32 | 0.10 | 96.2 | |
| 25 | 7.5 / 42.5 | Chil. / R | 16.31 | | 2.0 | 700 | 2 | B | 138 | 0.21 | 91.8 | |
| 26 | 7.5 / 42.5 | Chil. / H | 24.46 | | 2.0 | 700 | 2 | B | 26 | 0.34 | 92.5 | |
| 27 | 50 | H | 28.5 | | 1.75 | 750 | 2 | A | 14 | 0.33 | 98.8 | |
| 28 | 50 | H | 28.5 | | 2.1 | 750 | 2 | B | 28 | 0.17 | 98.9 | |
| 29 | 50 | R | 19.5 | | 0.8 | 750 | 2 | A | 30 | 0.85 | 87.7 | |
| 30 | 50 | R | 19.5 | | 0.9 | 750 | 2 | A | 43 | 0.39 | 91.0 | |
| 31 | 50 | R | 15.8 | | 0.85 | 750 | 2 | B | 295 | 0.02 | 76.5 | |
| 32 | 50 | H | 28.5 | | 1.05 | 720 | 2 | A | 10 | 1.66 | 91.3 | |
| 33 | 50 | H | 28.5 | | 1.05 | 720 | 2 | B | 59 | 0.11 | 86.9 | |
| 34 | 50 | R | 15.0 | 6) | 0.9 | 720 | 2 | A | 104 | 0.19 | 57.9 | |
| 35 | 50 | R | 15.81 | 3) | 0.85 | 750 | 2 | A | 93 | 0.16 | 90.3 | |
| 36 | 50 | R | 15.81 | 3) | 0.85 | 750 | 2 | B | 420 | 0.02 | 77.4 | |

We claim:

1. A process for the extraction of vanadium containing slags which comprises heating vanadium containing slags in a reaction furnace with sodium carbonate and oxygen at a temperature between 600°C and 800°C to provide a reaction product containing soluble vanadate and subsequently leaching the reaction product with water to provide a vanadate solution the amount of sodium carbonate utilized being such that the ratio is at least 1.1 and does not exceed 4.

2. A process as in claim 1, wherein the ratio is between 1.2 and 2.5.

3. A process as in claim 2, wherein the ratio is between 1.5 and 2.2

4. A process as in claim 2 wherein the heating is conducted between 700°C and 800°C.

5. A process as in claim 3 wherein the heating is conducted between 700°C and 800°C.

* * * * *

UNITED STATES PATENT AND TRADEMARK OFFICE
CERTIFICATE OF CORRECTION

PATENT NO. : 3,929,460
DATED : December 30, 1975
INVENTOR(S) : Franciscus J. W. M. Peters, et al It is certified that error appears in the above-identified patent and that said Letters Patent are hereby corrected as shown below:

In claim 1, after line 8, the following ratio should be inserted:

$$\frac{\text{quantity by weight of sodium carbonate}}{\text{quantity by weight vanadium calculated as vanadium pentoxide}}$$

Column 4, lines 1 and 2 should be deleted.

Signed and Sealed this sixteenth Day of March 1976

[SEAL]

Attest:

RUTH C. MASON
*Attesting Officer*

C. MARSHALL DANN
*Commissioner of Patents and Trademarks*